(12) United States Patent
Johnson et al.

(10) Patent No.: US 11,746,810 B2
(45) Date of Patent: Sep. 5, 2023

(54) HYBRID FASTENER ASSEMBLY

(71) Applicant: ILLINOIS TOOL WORKS INC., Glenview, IL (US)

(72) Inventors: Allande Johnson, Pune (IN); Mahantesh S Gokavi, Pune (IN)

(73) Assignee: Illinois Tool Works Inc., Glenview, IL (US)

( * ) Notice: Subject to any disclaimer, the term of this patent is extended or adjusted under 35 U.S.C. 154(b) by 225 days.

(21) Appl. No.: 17/360,034

(22) Filed: Jun. 28, 2021

(65) Prior Publication Data
US 2022/0003255 A1   Jan. 6, 2022

(30) Foreign Application Priority Data
Jul. 3, 2020 (IN) .............................. 202021028468

(51) Int. Cl.
*F16B 43/00* (2006.01)
*F16B 5/02* (2006.01)

(52) U.S. Cl.
CPC ...... *F16B 5/0258* (2013.01); *F16B 2200/506* (2018.08)

(58) Field of Classification Search
CPC . F16B 37/044; F16B 2200/506; F16B 5/0258
USPC ........ 411/123, 432, 108, 112, 128, 130, 131
See application file for complete search history.

(56) References Cited

U.S. PATENT DOCUMENTS

| | | | | |
|---|---|---|---|---|
| 759,038 | A * | 5/1904 | Smith | F16B 37/043 411/103 |
| 2,394,729 | A * | 2/1946 | Tinnerman | F16B 37/044 411/970 |
| 2,433,607 | A * | 12/1947 | Hallock | F16B 37/044 29/523 |
| 2,542,375 | A * | 2/1951 | Torresen | F16B 37/044 411/84 |
| 3,388,627 | A * | 6/1968 | Tinnerman | F16B 37/12 411/432 |
| 2004/0202523 | A1* | 10/2004 | Csik | F16B 37/043 411/112 |
| 2008/0310931 | A1* | 12/2008 | Csik | F16B 37/043 411/103 |
| 2017/0350436 | A1* | 12/2017 | Vovan | F16B 37/04 |

* cited by examiner

*Primary Examiner* — Gary W Estremsky
(74) *Attorney, Agent, or Firm* — Quarles & Brady LLP

(57) ABSTRACT

A hybrid fastener assembly includes a body and a removable insert. The removable insert includes a first flange having a first circular hole. The body includes a receptacle, a second circular hole, a retention mechanism, and a plurality of lateral walls. The removable insert is accommodated in the receptacle and is inserted in a lateral direction perpendicular to a central longitudinal axis of the body. The second circular hole aligns with the first circular hole to form a channel for receiving the threaded fastener. The retention mechanism secures the removable insert inside the receptacle. At least two lateral walls include a snap lock for mounting the hybrid fastener assembly to a first component.

10 Claims, 8 Drawing Sheets

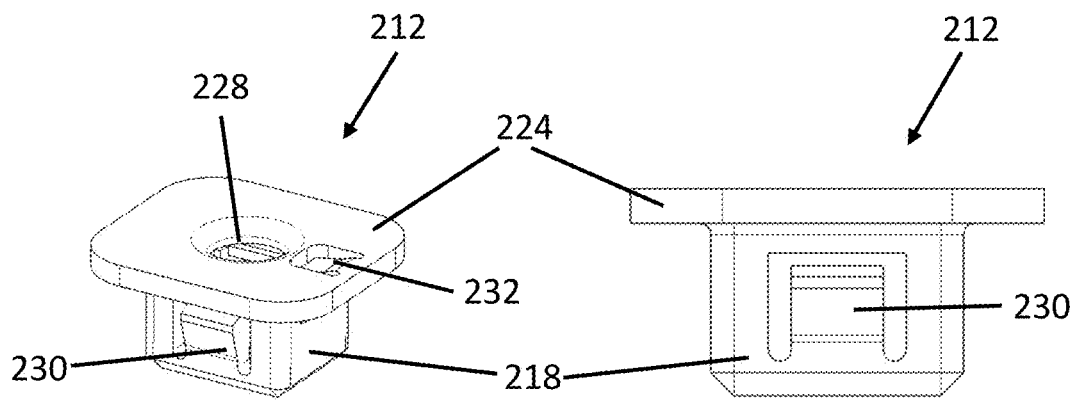
FIG. 3A
FIG. 3B
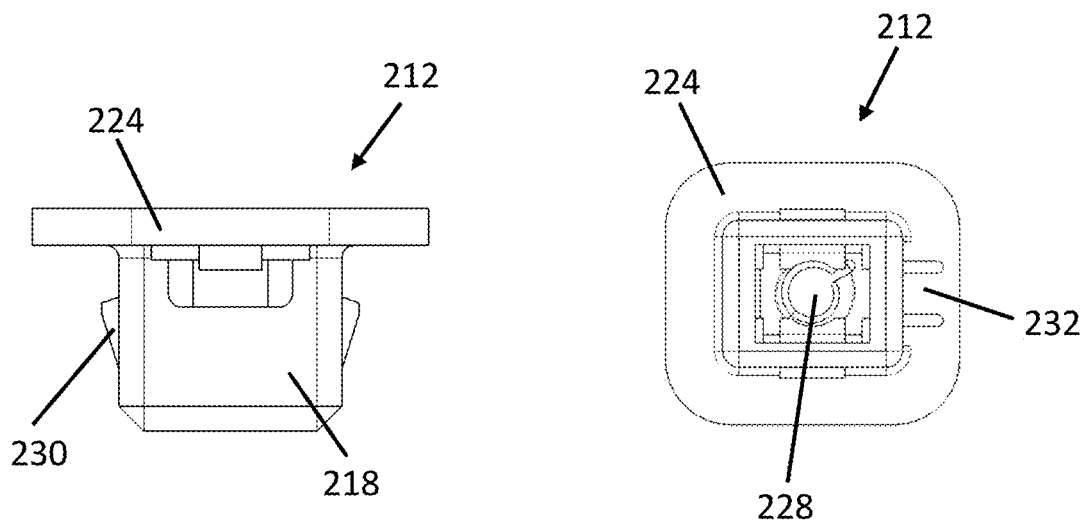
FIG. 3C
FIG. 3D

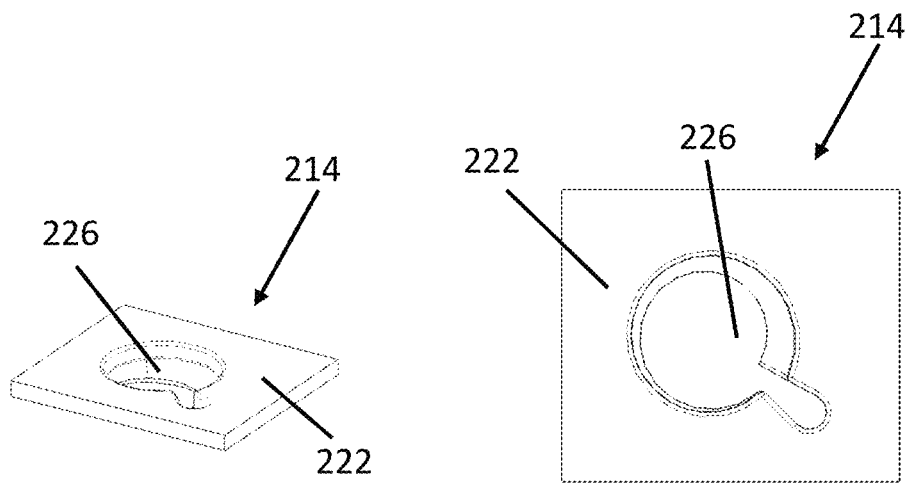
FIG. 4A
FIG. 4B
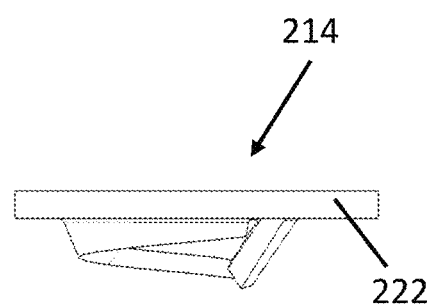
FIG. 4C

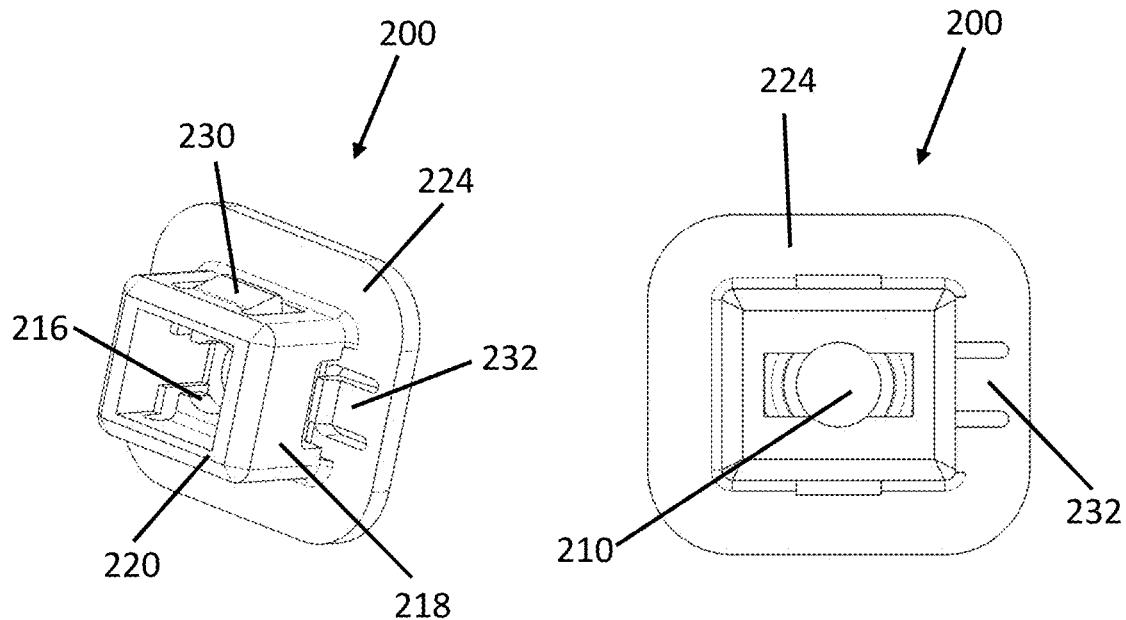
FIG. 6A
FIG. 6B
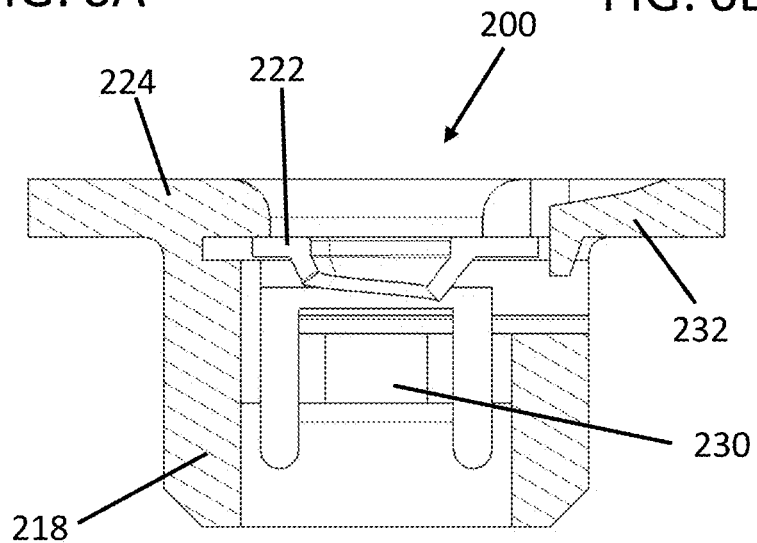
FIG. 6C

HYBRID FASTENER ASSEMBLY

CROSS REFERENCES TO RELATED APPLICATIONS

This application claims the benefit of Indian Patent Application No. 202021028468, filed on Jul. 3, 2020, which is incorporated herein by reference in its entirety.

BACKGROUND

Various assemblies include panels or components connected to one another. Usually, fasteners are used to secure such components to each other and can find applications across industries. In an example, such fasteners may be used in automotive industry, for instance, for fixing various trims to a body panel. For example, fasteners may be used to mount a trim or a component to a sheet metal door panel of the vehicle. In such an example, a grommet hybrid fastener assembly may be used for mounting a door handle cup, which is used to accommodate a door handle, to the sheet metal door panel in a rigid manner. Different fasteners may have different designs depending on the application for which the fastener is to be used. For example, fasteners used for mounting a component to the sheet metal door panel may have a different design from a fastener used for mounting a carpet trim to the vehicle floor.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 3A illustrates a perspective view of a body of the hybrid fastener assembly, according to an example of the present subject matter.

FIG. 3B illustrates a side view of the body of the hybrid fastener assembly, according to an example of the present subject matter.

FIG. 3C illustrates another side view of the body of the hybrid fastener assembly, according to an example of the present subject matter.

FIG. 3D illustrates a top view of the body of the hybrid fastener assembly, according to an example of the present subject matter.

FIG. 4A illustrates a perspective view of a removable insert of the hybrid fastener assembly, according to an example of the present subject matter.

FIG. 4B illustrates a top view of the removable insert of the hybrid fastener assembly, according to an example of the present subject matter.

FIG. 4C illustrates a side view of the removable insert of the hybrid fastener assembly, according to an example of the present subject matter.

FIG. 6A illustrates a perspective view of the hybrid fastener assembly in the assembled state, according to an example of the present subject matter.

FIG. 6B illustrates a top view of the hybrid fastener assembly in the assembled state, according to an example of the present subject matter.

FIG. 6C illustrates a side view of the hybrid fastener assembly in the assembled state, according to an example of the present subject matter.

Figure 1:
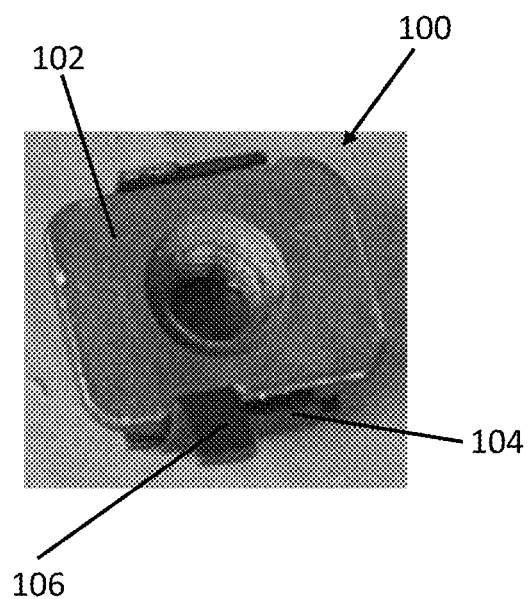
FIG. 1 illustrates a conventional grommet-type fastener, as an example of conventional fasteners.

Throughout the drawings, identical reference numbers designate similar elements, but may not designate identical elements. The figures are not necessarily to scale, and the size of some parts may be exaggerated to more clearly illustrate the example shown. Moreover, the drawings provide examples and/or examples consistent with the description; however, the description is not limited to the examples and/or examples provided in the drawings.

DETAILED DESCRIPTION

Generally, in order to hold the components together, fasteners are used. Certain fasteners may have to be specifically designed for specific applications. For example, a fastener, such as a grommet-type fastener, may be used in a door assembly for coupling a door handle cup as well as a door trim to the sheet metal door panel. In such an example, the grommet-type fastener can be coupled to the sheet metal door panel and the door handle cup and the door trim can be mounted thereto. Such a fastener, usually, has a complex design and has sub-parts which are, usually, heavy and cause a substantial amount of load on the components. As an example, for a certain load capability, the weight of the grommet-type fastener is 4 grams.

For instance, the grommet-type fastener can have two sub-parts, namely, a stamped part made by stamping a metal and used for coupling the grommet-type fastener to the sheet metal door panel, and a cast part made by casting a metal and mounted to the stamped part for mounting the door trim and the door handle cup. The stamped part has a plurality of snaps which can be used for mounting the grommet-type fastener to the sheet metal door panel. In said example, to keep the cost of the fastener low, the material or metal used for the stamped part is such that the metal is considerably brittle and, therefore, is non-serviceable. For instance, the snaps formed in the stamped part may have to be broken to remove the fastener from the sheet metal door panel. Therefore, each time the fastener is to be removed, it has to be replaced due to the damage to the snaps.

Further, besides having a complex design and involving a high cost of manufacturing and the material, the stamped part, being of metal, can rub against the metal of the sheet metal door panel and cause the coating on the sheet metal door panel to be removed, thereby exposing the metal sheet of the sheet metal door panel, for example, to elements of nature which may cause damage to the metal, for instance, by rusting.

Conventionally, the fasteners, such as the grommet-type fasteners, are formed of plastic or polymer instead of being metallic, so as to address the issues associated with the metallic fastener. However, such polymeric or plastic fasteners may be unable to withstand the forces, for instance, the torque, due to the fastening to the door trim and the door handle cup. On the other hand, if the fasteners formed with such materials are designed to have the required strength, the size of the fasteners may be very large.

Attempts have been conventionally made to have the grommet-type fasteners made partially of polymer and partially of plastic. For example, the stamped part is made of a polymer instead of a metal and the cast part is made of metal by casting or machining. In such a case, the replacement part, for instance, made of plastic, has to be designed to have a large size so as to match a strength of the metal stamped part so that the replacement part is able to appropriately hold the cast part. For example, if the metallic cast part and the metallic stamped part are 10 millimetre (mm) in width, the replacement part made of a polymer may require to be at least 20 mm in width, i.e., double the previous size. Accordingly, the overall size of the grommet hybrid fastener assembly may increase and may require further modification in the door panel and the door trim design to be able to be accommodated. In turn, for both the fastener as well as the door trim and the sheet metal door panel, there is an increased cost of material and cost of new tooling, which may lead to an overall increase in the cost of manufacturing.

Examples of a hybrid fastener assembly are provided which can be used for coupling components together, for instance, in conjunction with a threaded fastener. The hybrid fastener assembly may be used for securing components, such as for coupling a door trim and a door handle cup to the door panel made of sheet metal. In said example, the hybrid fastener assembly may be designed as a grommet-type fastener having an internally threaded circular hole to receive a threaded fastener, where the internal threads in the circular hole engages with the external threads of the threaded fastener. The hybrid fastener assembly, in accordance with the examples of the present subject matter, is designed to have high serviceability, long service life, low weight, and low cost.

According to an example, the hybrid fastener assembly has two parts, namely—a body and a removable insert which is insertable into the body. The body has a receptacle to receive the removable insert. In one example, the body can be formed as a hollow cuboidal structure defining the receptacle therein, i.e., the body can have four lateral walls, a bottom wall, and a top wall. The removable insert may have a first flange which abuts against the top wall of the body in an assembled position of the hybrid fastener assembly, i.e., when the removable insert is inserted into the body. In one example, the top wall of the body may be formed as a second flange. In said example, the first flange of the removable insert is adapted to abut against the second flange of the body in the assembled position of the hybrid fastener assembly. Further, the body can have an opening of the receptacle provided on one of the lateral walls through which the removable insert can be introduced into the body. The body as well as the removable insert both have internally threaded circular holes for receiving a threaded fastener, for fastening the components to the hybrid fastener assembly. For example, in the example where the hybrid fastener assembly is used in the door panel assembly, the threaded fastener can be used for coupling a door handle cup and the door trim to the sheet metal of the door panel. In the assembled condition, i.e., when the removable insert is inserted into the body, the two internally threaded circular holes of the body and the removable insert can be substantially aligned to receive the threaded fastener.

In addition, the hybrid fastener assembly can have provisions for coupling to one of the components that it is to be used to couple. In continuation to the example above, where the hybrid fastener assembly is usable with a door panel assembly, the hybrid fastener assembly can be designed to be coupled to the door panel. On two parallel lateral walls, snap locks can be provided for mounting and attaching the hybrid fastener assembly to the door panel. For instance, each snap lock can be formed as a snap-fit lug which can fit into a complementary structure provided in the sheet metal body of the door panel. In another example, the snap locks can be provided on all the lateral walls of the body of the hybrid fastener assembly except the wall having the opening of the receptacle. In yet another example, the wall bearing the opening of the receptacle can have a differently designed snap lock than those on the other lateral walls, depending on the availability of surface of the lateral wall bearing the opening of the receptacle. In other examples, the snap lock on each lateral wall can have a different design.

Further, according to an aspect, the hybrid fastener assembly can also have provisions to ensure that the two sub-components, i.e., the body and the removable insert, remain attached and do not inadvertently detach, for example, during transit or even during handling for assemblage. According to said aspect, the body can have a retention mechanism with which the removable insert can lock so that the removable insert does not inadvertently disengage from the body. As mentioned in an example above, the first flange of the removable insert abuts flatly against the second flange of the body. Accordingly, in said example, the retention mechanism can be provided as extending along a plane of the first flange and biased slightly towards the opening of the receptacle and extending into the opening of the receptacle. Accordingly, when the removable insert is introduced, the retention mechanism allows the removable insert to slide into the opening of the receptacle. As the removable insert is being introduced into the opening of the receptacle, the retention mechanism is pushed away from its biasing direction by the second flange. Once the removable insert is fully inserted into the opening of the receptacle, the retention mechanism, for example, the snap lock, snaps due to its inherent biasing force and locks the removable insert therein with an edge of the retention mechanism abutting against the first flange of the removable insert.

In view of the foregoing, the assemblage of the various sub-components of the hybrid fastener assembly is simply and ergonomic. The assembly can be done without the involvement of any tools or specialized equipment or even skilled labour. The assembly can be done quickly and even by a lay-user. Accordingly, the design of the hybrid fastener assembly can assist in achieving high productivity in its assemblage and also assembly with the relevant components, such as the door panel.

According to an aspect, different designs of the removable insert can be used in the hybrid fastener assembly, and the body, for instance, the opening of the receptacle in the body, is so designed that it can accommodate the different designs. As an example, the removable insert can have a low-torque design and a high-torque design. As the names suggest, the low torque design of the removable insert is designed to be assembled with the threaded fastener with application of considerably low torque, whereas the high torque design requires application of high torque for assembly with the threaded fastener. In one example, the different designs can have different number of internal threads on the removable insert. In another example, the different designs can have different types of internal threads, each requiring different amount of torque, while the number of internal threads on the removable insert remain the same. In yet another example, the number of threads as well as the design or type of threads can both vary for achieving varying amounts of torque required for assembly. For instance, the first circular hole is designed such that the removable insert is adapted for low-torque applications, for example, the removable insert includes a single internal thread, or two internal threads. In another example, the first circular hole is designed such that the removable insert is adapted for high-torque applications, for example, the removable insert includes a plurality of internal threads.

As the name suggests, as an example, the hybrid fastener assembly can be made of the two components having different compositions. According to an aspect, the body of the hybrid fastener assembly can be made of a low-cost material, such as polymer, whereas the removable insert can be made of a hard, strong material, such as a metal. In one example, the body can be made of plastic whereas the removable insert can be made of stainless steel. In said example, the size of the removable insert is considerably small and, therefore, even with the use of stainless-steel, the cost of the hybrid fastener assembly remains largely unaffected in comparison to the conventional fasteners. The cost also remains unaffected because the cost of stainless-steel is offset by the low cost of the polymer material used for the body. With the use of stainless-steel, the removable insert and, hence, the hybrid fastener assembly remains protected from natural elements, for instance, rusting. In addition, the use of polymer also protects the hybrid fastener assembly from elements of nature. As a result, the service life of the hybrid fastener assembly is considerably long.

Further, the hybrid fastener assembly is so designed that even with the use of polymer for the body, the size is compacter than the conventional fastener while the weight is reduced. As an example, the weight of the hybrid fastener assembly of the present subject matter is about 60% less than the weight of the conventional fastener used for a similar application and in similar force/load applications. For instance, for the conventional grommet-type fastener which is designed for a certain load bearing capability and has a weight of 4 grams, the hybrid fastener assembly of the present subject matter, designed for the same load bearing capability, can have a weight in the range of about 1.2 grams (for the low-torque design) to 2.1 grams (for the high torque design). Even with the reduction in size, the material of the removable insert is so selected that it ensures that the strength and durability of the hybrid fastener assembly remains uncompromised. Further, since the removable insert is a substantially small component, the cost of the material of the removable insert, as explained above, does not considerably influence the overall cost of the hybrid fastener assembly. To further assist in the reduction in weight, the removable insert is designed as a stamped part and not as a machined part, which helps in keeping the size and weight of the insert low. As an example, the removable insert can be stamped and is not required to be machined because precision is not required for the insert given its application in the hybrid fastener assembly, and even a stamped component can be used which is not precisely formed.

Further, as part of designing the hybrid fastener assembly with considerable strength and durability, the body of the hybrid fastener assembly is designed with the opening of the receptacle to receive the removable insert in a lateral direction perpendicular to a central longitudinal axis of the body (instead of receiving it in an axial direction or in direction of receiving the threaded fastener). Such a design allows for the first flange of the removable insert to be sandwiched between the receptacle of the body and the second flange of the body and such a construction can impart considerable strength to the hybrid fastener assembly. With the provision of laterally receiving the removable insert, the body can be made as a single component which not only is easy and cost-effective for manufacturing but also has greater strength and durability. In other words, with such a design, the body of the hybrid fastener assembly can be moulded as a single piece so as to have adequate strength for appropriately supporting and holding the removable insert.

Another design of the hybrid fastener assembly is envisaged, in which the removable insert is designed to be axially insertable (i.e., along an axis of the hole for receiving the threaded fastener). In such a case, the body of the hybrid fastener assembly is formed in two separate parts, i.e., the receptacle is formed separately, and the second flange is formed separately. In such a case, the receptacle would receive the removable insert and then the flange would be positioned thereon to sandwich the removable insert between the receptacle and the second flange. The two-piece design, though feasible, has the following points for due consideration—(1) the height of the hybrid fastener assembly would increase as the second flange and the receptacle are now to actively sandwich the removable insert, and (2) to lock the receptacle and the second flange, a robust snap/lock will be required which will substantially increase the size, material, and the overall cost of the hybrid fastener assembly.

The above aspects are further illustrated in the figures and described in the corresponding description below. It should be noted that the description and figures merely illustrate principles of the present subject matter. Therefore, various arrangements that encompass the principles of the present subject matter, although not explicitly described or shown herein, may be devised from the description and are included within its scope. Additionally, the word "coupled" is used throughout for clarity of the description and may include either a direct connection or an indirect connection.

FIG. 1 illustrates a conventional grommet-type fastener 100 (prior art) that may be used in a door assembly for coupling a door handle cup as well as a door trim to the sheet metal door panel, as an example of conventional designs of the fasteners. In such an example, the grommet-type fastener 100 can be coupled to the sheet metal door panel and the door handle cup and the door trim can be mounted thereto. Such a fastener 100, usually, has a complex design and has sub-parts which are, usually, heavy and cause a substantial amount of load on the components.

For instance, the grommet-type fastener 100 can have two sub-parts, namely, a stamped part 102 made by stamping a metal and used for coupling the grommet-type fastener 100 to the sheet metal door panel, and a cast part 104 made by casting a metal and mounted to the stamped part for mounting the door trim and the door handle cup. The stamped part 102 has a plurality of snaps 106 which can be used for mounting the grommet-type fastener 100 to the sheet metal door panel. In said example, to keep the cost of the fastener 100 low, the material or metal used for the stamped part 102 is such that the metal is considerably brittle and, therefore, is non-serviceable. For instance, the snaps 106 formed in the stamped part 102 may have to be broken to remove the fastener 100 from the sheet metal door panel. Therefore, each time the fastener 100 is to be removed, it has to be replaced due to the damage to the snaps 106.

Further, besides having a complex design and involving a high cost of manufacturing and the material, the stamped part 102, being made from metal, can rub against the metal of the sheet metal door panel and cause the coating on the sheet metal door panel to be removed, thereby exposing the metal sheet of the sheet metal door panel, for example, to elements of nature which may cause damage to the metal, for instance, by rusting.

Figure 2:
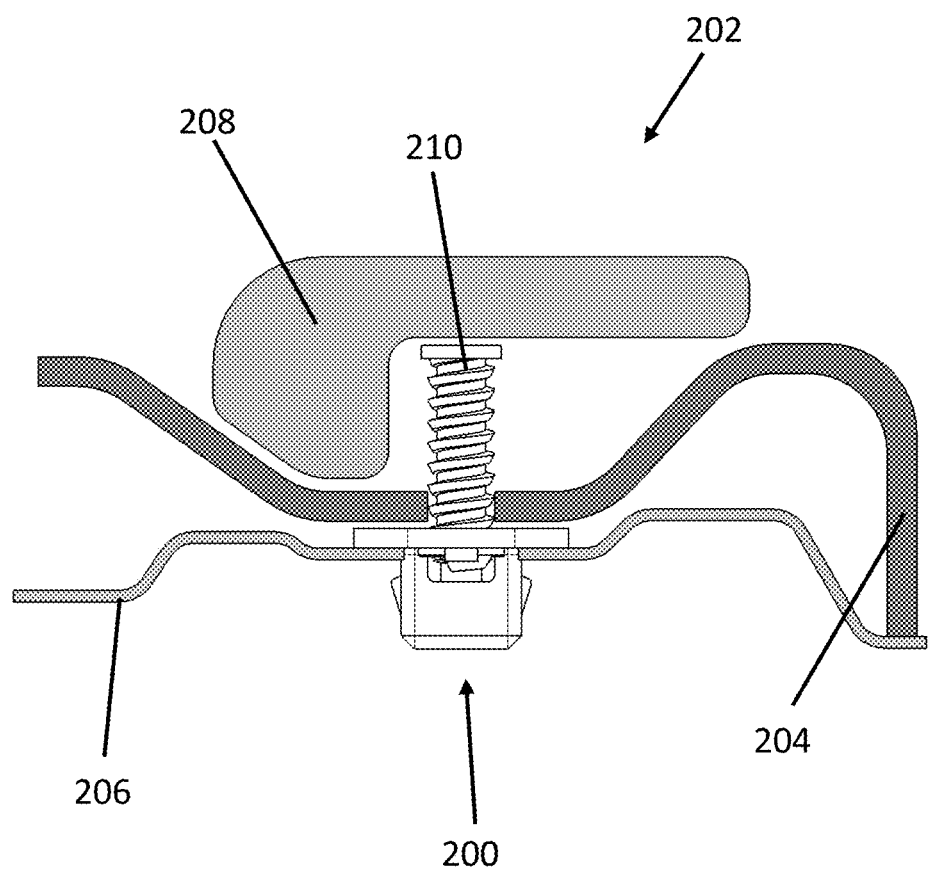
FIG. 2 illustrates a cross-sectional view of a hybrid fastener assembly in an assembled state with the components, in accordance with an example of the present subject matter.

FIG. 2 illustrates a cross-sectional view of a hybrid fastener assembly 200 in an assembled state with the components, in accordance with one example of the present subject matter. As shown in FIG. 2 as an example, the hybrid fastener assembly 200 is used in a door panel assembly 202. The door panel assembly 202 includes a first component 206, such as a door trim made of plastic, a second component 204, such as a door panel made of a sheet metal, a door trim 206 made of plastic, and a door handle cup (not shown) made of plastic. The door handle cup can accommodate a door handle 208 of the door latching-unlatching assembly (not shown). As shown, as an example, the hybrid fastener assembly 200 can be detachably coupled to the door trim 206, and the other parts of the door panel assembly 202 can be assembled using the threaded fastener 210. According to said example, the hybrid fastener assembly 200 has two parts, namely—a body and a removable insert which is insertable into the body.

FIG. 3A illustrates a perspective view of the body 212 of the hybrid fastener assembly 200, according to an example of the present subject matter. FIG. 3B illustrates a side view of the body 212 of the hybrid fastener assembly 200, according to an example of the present subject matter. FIG. 3C illustrates another side view of the body 212 of the hybrid fastener assembly 200, according to an example of the present subject matter. FIG. 3D illustrates a top view of the body 212 of the hybrid fastener assembly 200, according to an example of the present subject matter. For the sake of brevity and ease of understanding, the subject matter is described in conjunctive reference to FIGS. 3A, 3B, 3C and 3D.

In one example, the body 212 is made of a non-metallic material. For instance, the body 212 may be made of plastic. In said example, the body 212 may be manufactured using a moulding process. The body 212 has a receptacle to receive the removable insert. In one example, the body 212 can be formed as a hollow cuboidal structure defining the receptacle therein, i.e., the body 212 can have four lateral walls 218 parallel to a central longitudinal axis of the body 212, a bottom wall 220, and a top wall. In one example, the top wall of the body 212 may be formed as a second flange 224.

Further, one of the lateral walls 218 of the body 212 may have an opening of the receptacle. In one example, the opening of the receptacle may be formed as a lateral slot on one of the lateral walls 218. The removable insert is inserted through the opening of the receptacle or the lateral slot. In other words, the removable insert is introduced into the body 212 via the opening of the receptacle. The removable insert 214 is inserted in a lateral direction (instead of receiving it in an axial direction or in direction of receiving the threaded fastener), where the lateral direction is a direction perpendicular to the central longitudinal axis of the body 212. Such a design allows for the first flange 222 of the removable insert to be sandwiched between the receptacle of the body 212 and the second flange 224 of the body 212, and such a construction can impart considerable strength to the hybrid fastener assembly. With the opening of the receptacle provided on one of the lateral walls 218 of the body 212 for laterally receiving the removable insert, the body 212 can be made as a single component which not only is easy and cost-effective for manufacturing but also has greater strength and durability. In other words, with such a design, the body 212 of the hybrid fastener assembly 200 can be moulded as a single piece so as to have adequate strength for appropriately supporting and holding the removable insert.

Figure 5A:
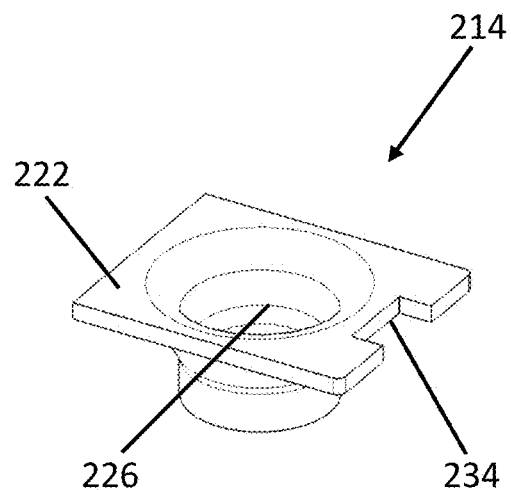
FIG. 5A illustrates a perspective view of the removable insert of the hybrid fastener assembly, according to another example of the present subject matter.
Figure 5B:
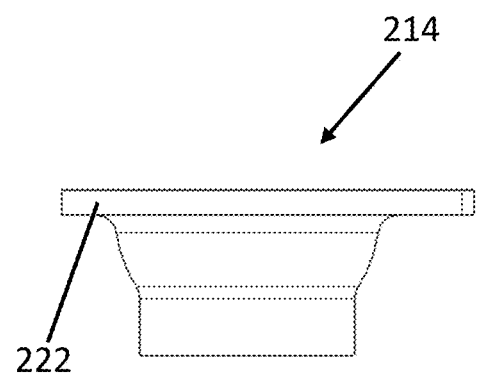
FIG. 5B illustrates a side view of the removable insert of the hybrid fastener assembly, according to another example of the present subject matter.

FIG. 4A illustrates a perspective view of the removable insert 214 of the hybrid fastener assembly 200, according to an example of the present subject matter. FIG. 4B illustrates a top view of the removable insert 214 of the hybrid fastener assembly 200, according to an example of the present subject matter. FIG. 4C illustrates a side view of the removable insert 214 of the hybrid fastener assembly 200, according to an example of the present subject matter. FIG. 5A illustrates a perspective view of the removable insert 214 of the hybrid fastener assembly 200, according to another example of the present subject matter. FIG. 5B illustrates a side view of the removable insert 214 of the hybrid fastener assembly 200, according to another example of the present subject matter. For the sake of brevity and ease of understanding, the subject matter is described in conjunctive reference to FIGS. 4A, 4B, 4C, 5A, and 5B.

The removable insert 214 is made of a metallic material. For instance, the removable insert 214 may be made of stainless steel. In said example, the removable insert 214 may be formed by a metal stamping process. The removable insert 214 may have a first flange 222 which abuts against the top wall of the body 212 in an assembled position of the hybrid fastener assembly 200, i.e., when the removable insert 214 is inserted into the body 212. In one example, the first flange 222 of the removable insert 214 is adapted to abut against the second flange 224 of the body 212 in the assembled position of the hybrid fastener assembly 200.

The first flange 222 of the removable insert 214 may include a first circular hole 226 with internal threads formed on an edge of the first circular hole 226. The second flange 224 of the body 212 may include a second circular hole 228 with internal threads formed on an edge of the second circular hole 228. The edge of the first circular hole 226 and the edge of the second circular hole is adapted to engage with the threaded fastener 210. When the removable insert 214 is inserted into the body 212 completely, the first circular hole 226 and the second circular hole 228 are substantially aligned to form a channel for receiving the threaded fastener 210, for fastening the components to the hybrid fastener assembly 200. For example, in the example where the hybrid fastener assembly 200 is usable in the door panel assembly 202, the threaded fastener 210 can be used for coupling a door handle cup and the door trim 206 to the sheet metal of the door panel 204.

Depending on the number of internal threads in the removable insert 214, the removable insert 214 may have varied thickness. For example, if the number of internal threads in the removable insert 214 is less, for example 1 or 2, the depth of the removable insert 214 will be less. Similarly, if the number of internal threads in the removable insert 214 is more, for example 3 or more, the depth of the removable insert 214 will be more.

Figure 7A:
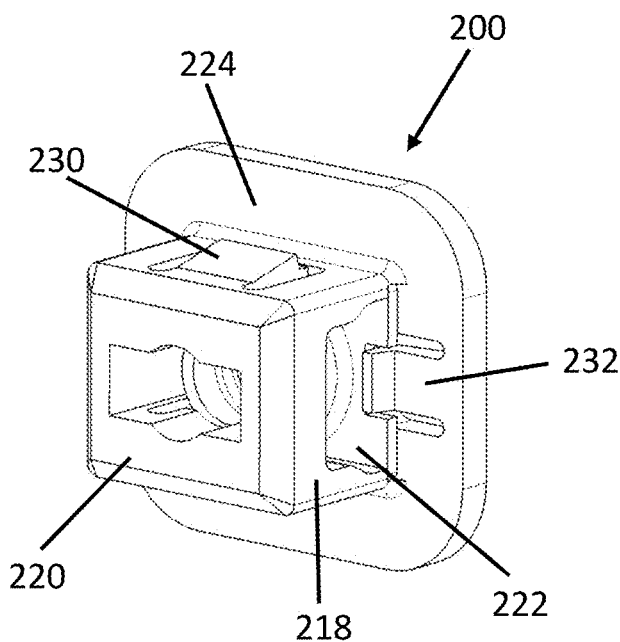
FIG. 7A illustrates a perspective view of the hybrid fastener assembly in the assembled state, according to another example of the present subject matter.
Figure 7B:
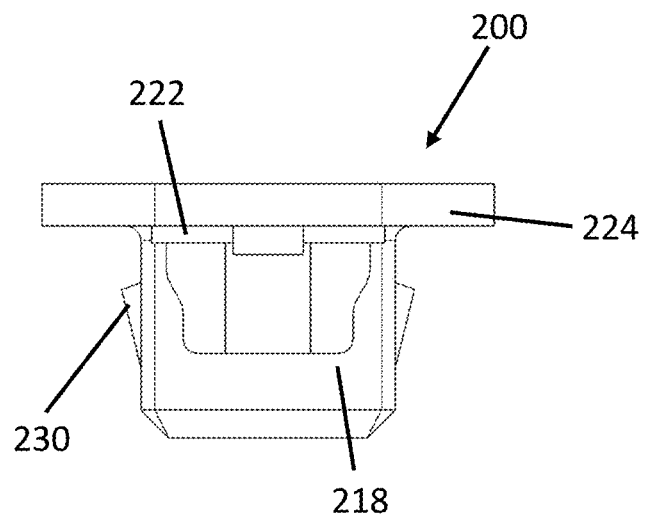
FIG. 7B illustrates a side view of the hybrid fastener assembly in the assembled state, according to another example of the present subject matter.

FIG. 6A illustrates a perspective view of the hybrid fastener assembly 200 in the assembled state, according to an example of the present subject matter. FIG. 6B illustrates a top view of the hybrid fastener assembly 200 in the assembled state, according to an example of the present subject matter. FIG. 6C illustrates a side view of the hybrid fastener assembly 200 in the assembled state, according to an example of the present subject matter. FIG. 7A illustrates a perspective view of the hybrid fastener assembly 200 in the assembled state, according to another example of the present subject matter. FIG. 7B illustrates a side view of the hybrid fastener assembly 200 in the assembled state, according to another example of the present subject matter. For the sake of brevity and ease of understanding, the subject matter is described in conjunctive reference to FIGS. 6A, 6B, 6C, 7A, and 7B.

According to an aspect, different designs of the removable insert 214 can be used in the hybrid fastener assembly 200, and the body 212, for instance, the opening of the receptacle in the body 212, is so designed that it can accommodate the different designs. As an example, the removable insert 214, and hence, the hybrid fastener assembly 200 can have a low-torque design shown in exploded view in FIGS. 4A-4C and in assembled view in FIGS. 6A-6C. In addition, in said example, the removable insert 214, and hence, the hybrid fastener assembly 200 can have a high-torque design which is shown in exploded view in FIGS. 5A-5B and in assembled view in FIGS. 7A-7B.

As the names suggest, the low torque design of the removable insert 214 is designed to be assembled with the threaded fastener 210 with application of considerably low torque, whereas the high torque design requires application of high torque for assembly with the threaded fastener 210. In one example, the different designs can have different number of internal threads on the removable insert 214. The number of internal threads required, for a low torque design, in the first circular hole 226 of the removable insert 214 is less in comparison to the number of internal threads required, for a high torque design, in the first circular hole 226. Accordingly, the thickness of the removable insert 214 for low torque designs is less in comparison to the thickness of the removable insert 214 for high torque designs. This is because as the number of threads increases in the first circular hole 226, the thickness of the removable insert 214 increases, and vice-versa. Accordingly, the edge of the first circular hole 226 as well as the edge of the second circular hole 228 may have a plurality of internal threads for high-torque applications. In one example, a single internal thread on the edge of the first circular hole 226 and the second circular hole 228 is sufficient for low-torque applications. In another example, the different designs can have different types of internal threads, each requiring different amounts of torque, while the number of internal threads on the removable insert 214 remain the same. In yet another example, the number of threads as well as the design or type of threads can both vary for achieving varying amounts of torque required for assembly.

In addition, the hybrid fastener assembly 200 can have provisions for coupling to one of the components that it is to be used to couple. In continuation to the example above, where the hybrid fastener assembly 200 is usable with a door panel assembly 202, the hybrid fastener assembly 200 can be designed to be coupled to the first component 206 or the door trim 206. On two parallel lateral walls 218 adjacent to the lateral wall having the opening of the receptacle 116, snap locks 230 can be provided for mounting and attaching the hybrid fastener assembly 200 to the door trim 206. In other words, the snap locks 230 are formed on lateral walls adjacent the lateral wall having the opening of the receptacle 116. For instance, each snap lock 230 can be formed as a snap-fit lug which can fit into a complementary structure provided in the sheet metal body of the door panel 204. In another example, the snap locks 230 can be provided on all the lateral walls 218 of the body 212 of the hybrid fastener assembly 200 except the wall having the opening of the receptacle 216. In yet another example, the lateral wall 218 bearing the opening of the receptacle 216 can have a differently designed snap lock 230 than those on the other lateral walls 218, depending on the availability of surface on the lateral wall 218 bearing the opening of the receptacle 216. In other examples, the snap lock 230 on each lateral wall 218 can have a different design. Various types of snap locks 230 are envisaged as part of the present subject matter.

Figure 8:
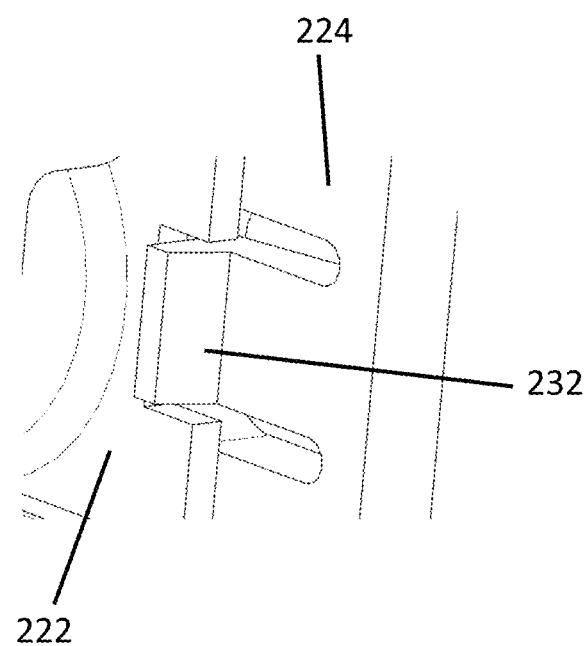
FIG. 8 illustrates a retention mechanism of the hybrid fastener assembly, in accordance with an example of the present subject matter.

Further, according to an aspect, the hybrid fastener assembly 200 can also have provisions to ensure that the two sub-components, i.e., the body 212 and the removable insert 214, remain attached and do not inadvertently detach, for example, during transit or even during handling for assemblage. Such provisions, referred to as a retention mechanism 232, has been shown in detail, as an example, in FIG. 8. According to said aspect, the body 212 can have the retention mechanism 232 formed in the proximity of the receptacle 216 and can secure the removable insert 214 inside the receptacle 216 of the body 212. Accordingly, the removable insert 214 does not inadvertently disengage from the body 212. In an example, the opening of the receptacle 216 is formed in proximity of retention mechanism 232.

In one example, the retention mechanism 232 is a snap lock which can lock with the removable insert 214, for instance with the first flange 222 of the removable insert 214. In another example, the retention mechanism 232 can be provided as a flexible protrusion on the second flange 224, such that the retention mechanism 232 protrudes from surface of the second flange 224 of the body 212. Further, the retention mechanism 232 is biased slightly towards the opening of the receptacle 216 to be in line with the opening of the receptacle 216. When the removable insert 214 is introduced into the opening of the receptacle 216, the retention mechanism 232 allows the removable insert 214 to slide into the opening of the receptacle 216. As the removable insert 214 is being introduced into the opening of the receptacle 216, the retention mechanism is pushed away from its biasing direction by the first flange 222 of the removable insert 214. Once the removable insert 214 is fully inserted into the receptacle 216, the retention mechanism 232, for example, the snap lock, snaps due to its inherent biasing force and locks the removable insert 214 therein with an edge of the retention mechanism 232 or the snap lock abutting against the first flange 222 of the removable insert 214. For instance, as shown in FIG. 5A, the first flange 222 can have a groove 234 formed on the periphery of the first flange 222. The groove 234 is to receive the edge of the retention mechanism 232 to adequately secure the removable insert 214 in the body 212. In other examples, other types of retention mechanism 232 are envisaged.

Although examples for the hybrid fastener assembly 200 have been described in language specific to structural features and/or methods, it is to be understood that the appended claims are not limited to the specific features described. Rather, the specific features are disclosed as examples of the hybrid fastener assembly 200.

The invention claimed is:
1. A hybrid fastener assembly comprising:
a removable insert comprising a first flange having a first circular hole, wherein an edge of the first circular hole in the first flange is configured to engage with a threaded fastener; and a body comprising:
- a receptacle that is configured to accommodate the removable insert in an assembled position of the hybrid fastener assembly, wherein the removable insert is insertable into the receptacle in a lateral direction perpendicular to a central longitudinal axis of the body;
- a second circular hole substantially aligned with the first circular hole in the assembled position to form a channel for receiving the threaded fastener, wherein an edge of the second circular hole in the body is to engage with the threaded fastener;
- a retention mechanism in proximity of the receptacle to secure the removable insert into the receptacle; and
- a plurality of lateral walls parallel to the central longitudinal axis of the body, wherein at least two lateral walls include a snap lock for mounting the hybrid fastener assembly to a first component, and
wherein the snap lock is disposed perpendicular to the retention mechanism.

2. The hybrid fastener assembly of claim 1, wherein the removable insert is made of a metallic material.

3. The hybrid fastener assembly of claim 2, wherein the removable insert is formed by a metal stamping process.

4. The hybrid fastener assembly of claim 1, wherein the body is made of a non-metallic material.

5. The hybrid fastener assembly of claim 4, wherein the body is made of plastic and is formed by a moulding process.

6. The hybrid fastener assembly of claim 1, wherein the first circular hole is adapted for low-torque applications.

7. The hybrid fastener assembly of claim 1, wherein each of the edge of the first circular hole and the edge of the second circular hole have a plurality of internal threads for high-torque applications.

8. The hybrid fastener assembly of claim 1, wherein the body comprises a second flange in proximity of the receptacle, wherein the second flange is to abut the first flange of the removable insert in the assembled position, wherein the retention mechanism is provided as a flexible protrusion on the second flange to protrude from surface of a second flange, and wherein the retention mechanism is biased to be in line with an opening of the receptacle.

9. The hybrid fastener assembly of claim 8, wherein the opening of the receptacle is formed in proximity of the retention mechanism.

10. The hybrid fastener assembly of claim 1, wherein the snap lock is formed on the at least two lateral walls adjacent to a lateral wall—that includes an opening of the receptacle.

* * * * *